United States Patent
Qi et al.

(10) Patent No.: US 10,706,552 B2
(45) Date of Patent: Jul. 7, 2020

(54) METHOD AND DEVICE FOR DETECTING CONCEALED OBJECTS IN MICROWAVE IMAGES

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Yanli Liu, Shenzhen (CN); Hanjiang Chen, Shenzhen (CN); Guangsheng Wu, Shenzhen (CN); Shukai Zhao, Shenzhen (CN); Qing Ding, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

( * ) Notice: Subject to any disclaimer, the term of this patent is extended or adjusted under 35 U.S.C. 154(b) by 188 days.

(21) Appl. No.: 16/019,562

(22) Filed: Jun. 27, 2018

(65) Prior Publication Data
US 2018/0342064 A1    Nov. 29, 2018

Related U.S. Application Data

(63) Continuation of application No. PCT/CN2017/083271, filed on May 5, 2017.

(30) Foreign Application Priority Data

May 12, 2016    (CN) .......................... 2016 1 0316116

(51) Int. Cl.
G06T 7/00    (2017.01)
G06T 7/13    (2017.01)
(Continued)

(52) U.S. Cl.
CPC .............. *G06T 7/13* (2017.01); *G01N 22/00* (2013.01); *G01V 5/0016* (2013.01);
(Continued)

(58) Field of Classification Search
None
See application file for complete search history.

(56) References Cited

U.S. PATENT DOCUMENTS

| 6,791,487 B1 * | 9/2004 | Singh | ...................... G01S 13/04 |
| | | | 342/192 |
| 2004/0041724 A1 * | 3/2004 | Levitan | ................... F41H 13/00 |
| | | | 342/22 |
| 2014/0319344 A1 * | 10/2014 | Miller | .................. H01J 37/222 |
| | | | 250/307 |

(Continued)

FOREIGN PATENT DOCUMENTS

| CN | 102542570 A | 7/2012 |
| CN | 102565794 A | 7/2012 |

(Continued)

*Primary Examiner* — Delomia L Gilliard

(57) ABSTRACT

The present disclosure relates to a method and device for detecting concealed dangerous objects in microwave images. The method includes: simultaneously processes multiple adjacent microwave images, obtains edge images of a single image by using two methods for each image, obtains dangerous-object edges of the single image by edge fitting operation, obtains a rough dangerous-object contour by performing a registration operation and a second edge fitting operation on the dangerous-object edges of the multiple images, and performs a regional-binarization operation and a filtering on the rough dangerous-object contour to obtain a second dangerous-object area. The present disclosure has high detection accuracy and calculation efficiency.

11 Claims, 5 Drawing Sheets

(51) Int. Cl.
    *G06T 7/12*         (2017.01)
    *G01V 5/00*         (2006.01)
    *G06T 7/174*        (2017.01)
    *G06T 7/11*         (2017.01)
    *G01N 22/00*       (2006.01)
    *G06K 9/00*         (2006.01)

(52) U.S. Cl.
    CPC .......... *G06K 9/00771* (2013.01); *G06T 7/001* (2013.01); *G06T 7/0002* (2013.01); *G06T 7/11* (2017.01); *G06T 7/12* (2017.01); *G06T 7/174* (2017.01); *G06K 2209/09* (2013.01); *G06T 2207/30196* (2013.01)

(56) References Cited

U.S. PATENT DOCUMENTS

| | | | |
|---|---|---|---|
| 2015/0208003 A1* | 7/2015 | Kuznetsov | H04N 5/30 348/46 |
| 2016/0117898 A1* | 4/2016 | Kuznetsov | H04N 13/239 340/600 |
| 2017/0270366 A1* | 9/2017 | Kuznetsov | G08B 29/185 |
| 2017/0329033 A1* | 11/2017 | Kuznetsov | G06K 9/00771 |
| 2018/0172871 A1* | 6/2018 | Kuznetsov | G01V 3/12 |
| 2018/0342064 A1* | 11/2018 | Qi | G01V 5/0016 |

FOREIGN PATENT DOCUMENTS

| | | | |
|---|---|---|---|
| CN | 102708372 A | 10/2012 | |
| CN | 103955940 A | 7/2014 | |
| CN | 104318568 A | 1/2015 | |
| CN | 105513035 A | 4/2016 | |

* cited by examiner

METHOD AND DEVICE FOR DETECTING CONCEALED OBJECTS IN MICROWAVE IMAGES

TECHNICAL FIELD

Embodiments of the present disclosure generally relate to image processing technology, and in particular relate to a method and device for detecting concealed objects in microwave images.

BACKGROUND

Microwaves have a certain penetration during propagation. Through microwave imaging technology, it can obtain the image of the object under the clothes of the scanned (human) body, and then automatically complete the detection of the dangerous objects such as metal instruments, ceramic knives, unknown liquids, and powders which are under the clothes of the scanned body based on the image of the object. During the inspection process, if the detection of suspicious dangerous objects is performed by the directly visual observation of security operators, it will have huge consumption in manpower, financial resources and time. Therefore, it is of great significance to design an automatic detection method to perform the automatic detection of concealed dangerous objects with different attributes and types which are possible to appear on a body shown in a microwave image.

The existing automatic object detection methods are generally divided into two types: the first one is for visible light image data; the second one is for microwave image data, while it is generally for single image detection. The above-mentioned two methods are not applicable to the security inspection system of microwave images for the main reasons are as follows: 1) the imaging mechanism of microwave images and visible light images are essentially different, and the dangerous objects detection method applied to visible light images cannot be directly applied to microwave images since the microwave image has low grayscale, low resolution, and is affected by speckle multiplicative noise; 2) since dangerous objects will show certain similarities and differences in adjacent images due to the difference in sampling angles, and it will depend on imaging quality too much and is easy to cause false detection when the detection is only performed on a single image, hence the feature detection method based on a single image cannot meet the requirement of the accuracy of the automatic detection of dangerous objects in a microwave security inspection system.

SUMMARY

Accordingly, regarding the above-mentioned issue, it is necessary to provide a method and device for detecting concealed objects in microwave images, which can realize the automatic detection of the concealed dangerous objects in microwave images and achieve higher detection accuracy.

In order to achieve the above-mentioned purpose, the present disclosure adopts the technical solutions as follows:

Firstly, the present disclosure provides a method for detecting concealed dangerous objects in microwave images, including:

obtaining at least two adjacent microwave images of body detection results;

obtaining a body-area image from each of the microwave images;

obtaining dangerous-object areas from each body-area image, and performing an edge extraction on each of the dangerous-object areas to obtain a first edge image of each of the microwave images;

performing dangerous-object edge detection on each body-area image to obtain a second edge image of each of the microwave images;

performing a first edge fitting operation on the first edge image and the second edge image to obtain dangerous-object edges of each of the microwave images;

performing a registration operation and a second edge fitting operation on the dangerous-object edges of each of the microwave images to obtain a rough dangerous-object contour;

performing a regional-binarization operation on the rough dangerous-object contour to obtain a first dangerous-object area; and filtering the first dangerous-object area to obtain a second dangerous-object area.

Secondly, the present disclosure also provides a de ee for detecting concealed dangerous objects in microwave images, including:

a microwave image acquisition module configured to obtain at least two adjacent microwave images of body detection results;

a body-area image acquisition module configured to obtain a body-area image from each of the microwave images;

a first edge image acquisition module configured to obtain dangerous-object areas from each body-area image, and perform an edge extraction on each of the dangerous-object areas to obtain a first edge image of each of the microwave images;

a second edge image acquisition module configured to perform a dangerous-object edge detection on each body-area image to obtain a second edge image of each of the microwave images;

a dangerous-object edge acquisition module configured to perform a first edge fitting operation on the first edge image and the second edge image to obtain dangerous-object edges of each of the microwave images;

a rough dangerous-object contour acquisition module configured to perform a registration operation and a second edge fitting operation on the dangerous-object edges of each of the microwave images to obtain a rough dangerous-object contour;

a first dangerous-object area acquisition module configured, to perform a regional-binarization operation on the rough dangerous-object contour to obtain a first dangerous-object area; and a second dangerous-object area acquisition nodule configured to filter the first dangerous-object area to obtain a second dangerous-object area.

In comparison with the existing technology, the method and device for detecting concealed dangerous objects in microwave images of the present disclosure have the following advantages:

(1) The present disclosure comprehensively utilizes the characteristics of the microwave detection results at different angles, which reduces the dependence of the detection result on a single image and the effect of imaging angle on the imaging quality of the dangerous-object areas.

(2) The present disclosure obtains the edge image in two ways simultaneously of each body-area image: detecting the dangerous-object areas and extracting the edges, as well as performing a dangerous-object area edge detection directly on the body-area image. Then, the edge fitting operation is performed on the edge image get through the two ways, so as to filter out part of the mis-detection area of each single image. Compared with the existing technology which simply relies on the gray-scale value for detection, the present disclosure effectively improves the detection accuracy, while the real-time execution can be guaranteed.

(3) The present disclosure can be effectively applied to a real microwave security inspection system, which has high detection accuracy and calculation efficiency, and meets the requirements for use, and solves the problem of the automatic detection of the hidden dangerous objects under clothes, in the microwave security inspection system.

DETAILED DESCRIPTION

Figure 1:
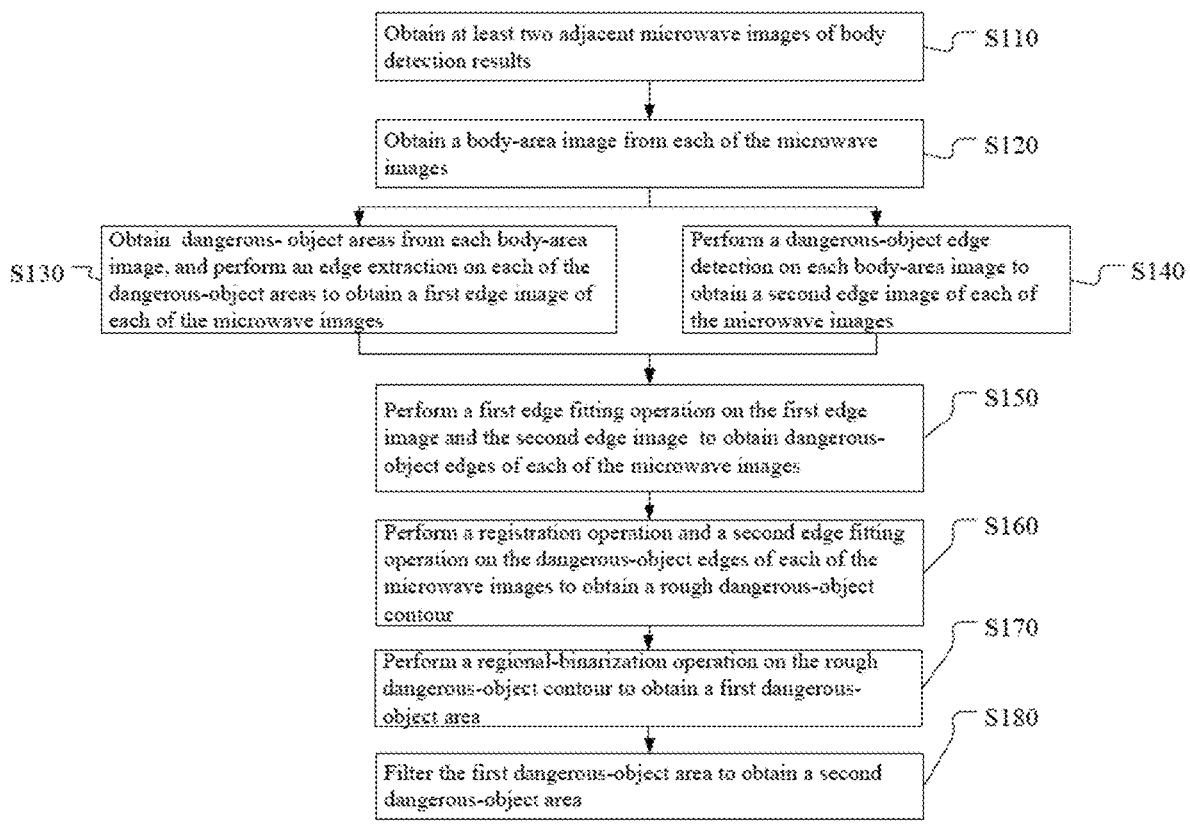
FIG. 1 is a flow chart of a method for detecting concealed dangerous objects in microwave images according to an embodiment of the present disclosure.

In a microwave security inspection system (e.g., a near-field millimeter wave imaging security inspection system), a microwave image is formed after a microwave signal is transmitted, received, and the received signal is imaged, then an automatic detection process for the concealed dangerous objects is performed based on the microwave image information, and then the results of the automatic detection is presented to the system operator to assist the system operator in making determinations, thereby completing the security inspection process.

Under normal circumstances, the interested dangerous objects are carious in their properties: in the aspect of materials, there are liquid, metal, plastic, powder, and the like; in the aspect of shape, there are mainly long strip, acute angle, short in width, and the like. In order to realize the automatic detection of the concealed dangerous objects in microwave images and achieve high detection accuracy, for the shown characteristics of the interested dangerous objects with different materials, shapes, sizes, and the like in microwave imaging results images, it is needed to analysis the content information of the microwave image, and the specific analysis results are as follows:

For a single image, in the aspect of materials, the interested dangerous objects of the material such as metal, liquid, plastic, and powder appear in a microwave image as a partial area with a higher or lower grayscale value; in the aspect of shape, the objects of different shape such as long strip and acute angle appear in the imaging results as more obvious edge structure features. For multiple adjacent images at different angles, due to the difference in imaging angles, there is a certain difference between the grayscale value of the imaging of the same interested dangerous object and the body imaging grayscale value, which results in at different angles that the interested dangerous objects appear as having a higher/lower grayscale value or a grayscale value similar to a (human) body in the microwave image.

The present disclosure utilizes these technical features to simultaneously process multiple adjacent microwave images, and obtains edge images of a single image by using two methods for each image, and obtains dangerous-object edges of the single image by edge fitting operation. On the one hand, the difference in the grayscale of the interested object and the body imaging is taken into account. On the other hand, the edge structure information of the interested object is also taken into account. Furthermore, a rough dangerous-object contour is obtained by performing a registration operation and a second edge fitting operation on the dangerous-object edges of the multiple images, and a regional-binarization operation and a filtering operation are performed on the rough dangerous-object contour, thereby completing the automatic detection of the dangerous-objects area hidden in a body.

In order to further illustrate the technical means and the effects achieved by the present disclosure, the technical solutions of the present disclosure will be clearly and completely described below with reference to the accompanying drawings and embodiments. It should be noted that the words "first" and "second" appearing in the text are only used to distinguish the same technical features, and do not limit the order and quantity of technical features.

Referring to FIG. 1, a flow chart of a method for detecting concealed dangerous objects in microwave images according to an embodiment of the present disclosure is depicted. The method may include the following blocks.

At S110: obtaining at least two adjacent microwave images of body detection results.

At S120: obtaining a body-area image from each of the microwave images.

At S130: obtaining dangerous-object a areas from each body-area image, and performing an edge extraction on each of the dangerous-object areas to obtain a first edge image of each of the microwave images.

At S140: performing a dangerous-object edge detection on each body-area image to obtain a second edge image of each of the microwave images.

At S150: performing a first edge fitting operation on the first edge image and the second edge image to obtain dangerous-object edges of each of the microwave images.

At S160: performing a registration operation and a second edge fitting operation on the dangerous-object edges of each of the microwave images to obtain a rough dangerous-object contour.

At S170: performing a regional-binarization operation on rough dangerous-object contour to obtain a first dangerous-object area.

At S180: filtering the first dangerous-object area to obtain a second dangerous-object area.

Figure 2:
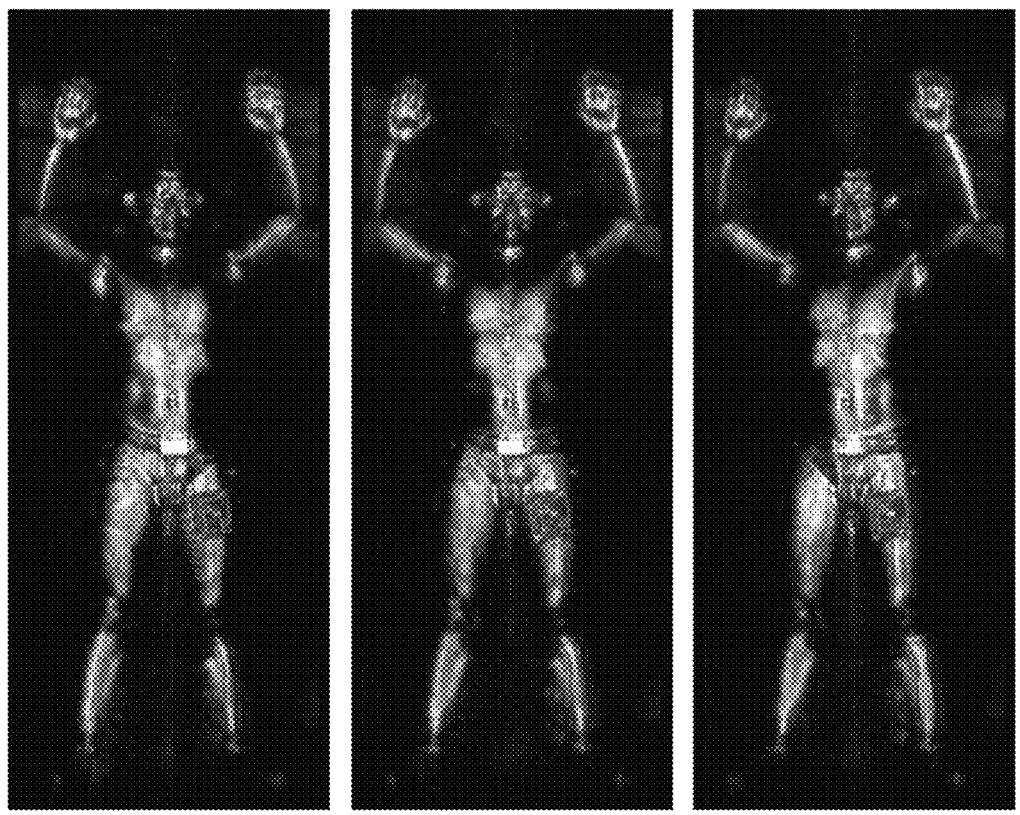
FIG. 2 is a schematic diagram of three obtained microwave images according to a specific embodiment of the present disclosure.

In block S110, adjacent microwave images $I_k$ which are sampled at different angles are obtained, and the number of obtained images can be determined according to actual needs. Referring to FIG. 2, a schematic diagram of three obtained microwave images according to a specific embodiment of the present disclosure is depicted. As shown in FIG. 2, three microwave images are obtained at different angles, where k=1, 2, 3.

In block S120, the microwave images $I_k$ may be segmented into a body region and a background region through a grayscale segmentation algorithm to obtain a body-area image $I_k'$. Where the grayscale segmentation algorithm may adopt an automatic threshold segmentation algorithm in the prior art.

When performing the grayscale segmentation, a segmentation threshold $T_k$ may be set, pixel region(s) in the microwave images $I_k$ which have a grayscale value higher than $T_k$ is extracted, and other pixel region(s) are considered as the background region and set to 0, as shown in the following formula:

$$I'_k(x, y) = \begin{cases} I_k(x, y) & I_k(x, y) \geq T_k \\ 0 & I_k(x, y) < T_k \end{cases}$$

The number of rows and columns of the matrix $I_k'$ is respectively equal to the number of rows and columns of the microwave image $I_k$.

In block S130, an adaptive fuzzy clustering algorithm may be used on the body-area image $I_k'$ to detect the dangerous-object areas, and then an edge extraction operator such as canny operator may be used to perform the edge extraction on the dangerous-object areas.

The blocks of using the adaptive fuzzy clustering algorithm to detect the dangerous-object areas specifically include:

S1301) setting a iteration stop condition $\varepsilon$ where $0<\varepsilon<1$, the initial value of the cluster number $c_k=2$, the initial value of the adaptive function $L_k(1)=0$, the initial value of the iteration number $I_k=0$, the fuzzy weighted index $m=2$;

S1302) randomly initializing a cluster center matrix $V_k^{(0)}=[v_{k1}^{(0)}, \ldots, v_{ki}^{(0)}, \ldots, v_{kc}^{(0)}]$, where $i=1, 2, \ldots, c$;

S1303) calculating an Euclidean distance $d_k(g_{kj}, v_{ki}^{(l)})=\|g_{kj}-v_{ki}^{(l)}\|$ of the j th pixel in the body-area image $I_k'$ and the l th iteration of the i th cluster center, and calculating a subjection level matrix $U_k^{(l)}$ of the $l_k$ th iteration and the cluster center matrix $V_k^{(l+1)}$ after the $l_k$ th iteration:

$$U_k^{(l)} = \begin{bmatrix} u_{k11}^{(l)} & \cdots & u_{k1j}^{(l)} & \cdots & u_{k1Co}^{(l)} \\ \vdots & \ddots & \vdots & \ddots & \vdots \\ u_{ki1}^{(l)} & \cdots & u_{kij}^{(l)} & \cdots & u_{kiCo}^{(l)} \\ \vdots & \ddots & \vdots & \ddots & \vdots \\ u_{kc1}^{(l)} & \cdots & u_{kcj}^{(l)} & \cdots & u_{kcCo}^{(l)} \end{bmatrix}$$

$$V_k^{(l+1)} = [v_{k1}^{(l+1)} \ldots v_{ki}^{(l+1)} \ldots v_{kc}^{(l+1)}]$$

where, the elements $u_{kij}^{(l)}$ of the i th row and the j th column of $U_k^{(l)}$ and the elements $v_{ki}^{(l+1)}$ of the i th of $V_k^{(l+1)}$ are calculated as follows:

$$u_{kij}^{(l)} = 1 \bigg/ \sum_{j=1}^{c_k} \left( \frac{d(g_{kj}, v_{ki}^{(l)})}{d(g_{kj}, v_{kj}^{(l)})} \right)^{2/(m-1)}$$

$$v_{ki}^{(l+1)} = \sum_{j=1}^{Co_k} (u_{kij}^{(l)})^m g_{kj} \bigg/ \sum_{j=1}^{Co_k} (u_{kij}^{(l)})^m$$

S1304) comparing $V_k^{(l)}$ with $V_k^{(l+1)}$, if $\|V_k^{(l+1)}-V_k^{(l)}\| < \varepsilon$, the iteration stops and block S1305 is performed, otherwise let $l_k=l_k+1$ and returns to block S1303; and S1305) calculating an adaptive function $L_k(c_k)$ when the cluster number is $c_k$. When $2<c_k<q_k$, $q_k$ is the set maximum number of clusters. If the point(s) which meet $L_k(c_k-1)>L_k(c_k-2)$ and $L_k(c_k-1)>L_k(c_k)$ exist, the clustering result when the cluster number $c_k=c_k-1$ is taken as the dangerous-object area $R_k$ and stops the iteration, otherwise let $c_k=c_k+1$ and returns to block S1302. When $c_k>q_k$, the clustering result when the cluster number $$c_k = \text{Arg}\left\{ \max_{2<c_k<q_k} (L_k(c_k)) \right\}$$

is taken as the dangerous-object area $R_k$; where the adaptive function $L_k(c_k)$ is calculated by the following formula:

$$L_k(c_k) = \frac{\sum_{i=1}^{c_k} \left( \sum_{j=1}^{Co_k} (u_{kij}^{(l)})^m \right) d^2(v_{ki}^{(l)}, X_k)/(c_k-1)}{\sum_{i=1}^{c_k} \sum_{j=1}^{Co_k} (u_{kij}^{(l)})^m d^2(g_{kj}, v_{ki}^{(l)})/(Co_k-c_k)}$$

where, $$X_k = \sum_{i=1}^{c_k} \sum_{j=1}^{Co_k} (u_{kij}^{(l)})^m g_{kj}/Co_k$$

represents the center vector of all pixel points in the background area of the k th frame $I_k'$.

Through the above-mentioned blocks, the dangerous-object areas of each image may be detected, and then the existing canny operator may be used to perform the edge extraction n the dangerous-object area $R_k$ to obtain the first edge image $e_{R_k}$.

In block S140, for the body-area image $I_k'$, the edge detection may be performed directly on the dangerous-object areas by using an edge detection operator to obtain the second edge image $e_k$, where the edge detection operator adopts an operator existing in the prior art, such as canny operator.

In block S110, edge fitting operation is performed on the first edge image $e_{R_k}$ obtained in block S130 and the second edge image $e_k$ obtained in block S140 to filter out part of the mis-detection area.

In one embodiment, block S150 may include:

S1501) obtaining absolute values of differences between the first edge image and the second edge image; and S1502) retaining edges in each of the microwave images with an absolute value of differences smaller than or equal to a preset first edge fitting threshold $\varepsilon_1$, and abandoning edges in each of the microwave images with an absolute value of differences greater than the first edge fitting threshold $\varepsilon_1$ to obtain the dangerous-object edges of each of the microwave images, that is, the edges of $|e_{R_k}-e_k| \leq \varepsilon_1$ are retained and the edges of $|e_{R_k}-e_k| > \varepsilon_1$ are abandoned to obtain the dangerous-object edge $e_k'$. In which, the first edge fitting threshold $\varepsilon_1$ is a real number and can be determined according to actual needs.

In block S160, the registration operation and the second edge fitting operation are performed on the dangerous-object edges of each of the microwave images obtained in block S150, to obtain the rough dangerous-object contour.

In one embodiment, block S160 may further include:

S1601) performing a feature-point detection and description operation on each of the microwave images $I_k$, to build a feature set $X_k$ for each of the microwave images.

The detection and description operation method of the feature-point may use an existing algorithm in the prior art, such as SIFT (Scale Invariant Feature Transform) algorithm.

S1602) selecting one of the microwave images as a reference frame, and obtaining corresponding relations between the feature points in the feature set of each of the microwave images except the reference frame, and the feature points in the feature set of the reference frame by Euclidean distance measure.

The reference frame can be arbitrarily selected. For example, if there are three microwave images, the first frame may be selected as the reference frame, or the second frame may be selected as the reference frame, or the third frame may be selected as the reference frame; and if there are two microwave images, the first frame or the second frame may be selected as the reference frame.

For a better understanding of this block, the following take three microwave images as an example, and the second frame is used as the reference frame, to specifically illustrate this block:

For the feature set $X_k$, the corresponding relations $f_1(X_1) \rightarrow X_2$ between the feature points in the feature set $X_1$ and the feature points in the feature set $X_2$ may be found through the Euclidean distance measure. If the normalized Euclidean distance between the feature points is smaller than a threshold $T_d(0<T_d<1)$, the feature point(s) are considered to not match. The corresponding relations $f_2(X_3) \rightarrow X_2$ between the feature points in the feature set $X_3$ and the feature points in the feature set $X_2$ may be obtained through the same method.

S1603) mapping the dangerous-object edges of the microwave images except the reference frame to the reference frame according to each of the corresponding relations.

To explain by the specific example in block S1602, the block is:

$$e_1'(x,y)=f_1(e_1(x,y))$$

$$e_3'(x,y)=f_2(e_3(x,y))$$

S1604) obtaining absolute values of differences between the dangerous-object edges of the microwave images except the reference frame and the dangerous-object edges of the reference frame.

S1605) retaining edges with an absolute value of differences smaller than or equal to a preset second edge fitting threshold $\varepsilon_2$, and abandoning edges with an absolute value of differences greater than the second edge fitting threshold, to obtain the rough dangerous-object contour $e_s$.

Blocks S1604 and S1605 perform the process on the second edge fitting operation. The rough dangerous-object contour $e_s$ may be obtained by the second edge fitting operation. In which, $\varepsilon_2$ is a real number, and the specific value may be determined according to actual needs.

In block S170, the regional-binarization operation is performed on the rough dangerous-object contour $e_s$ obtained in block S160 to obtain the first dangerous-object area $R_s$.

In one embodiment, the blocks of performing the regional-binarization operation on the rough dangerous-object contour may include:

setting a grayscale value of each pixel in the rough dangerous-object contour to 255; and setting a grayscale value of each pixel out of the rough dangerous-object contour to 0.

Through the above-mentioned binarization operation, the first dangerous-object area $R_s$ may be obtained.

In block S180, since the first dangerous-object area $R_s$ obtained in block S170 may contain some error information, further filtering may be required to obtain a precise dangerous-object area, that is, the second dangerous-object area. The filtering may be implemented according to existing methods in the prior art. For example, in one embodiment, filtering the first dangerous-object area includes the following blocks:

S1801) performing a morphological closed operation on the obtained first dangerous-object area along a x direction and a y direction; and S1802) filtering out sub-areas in the first dangerous-object area each having a size smaller than $T_a$, and remaining others as the second dangerous-object area, where $T_a$ is a natural number.

Figure 3:
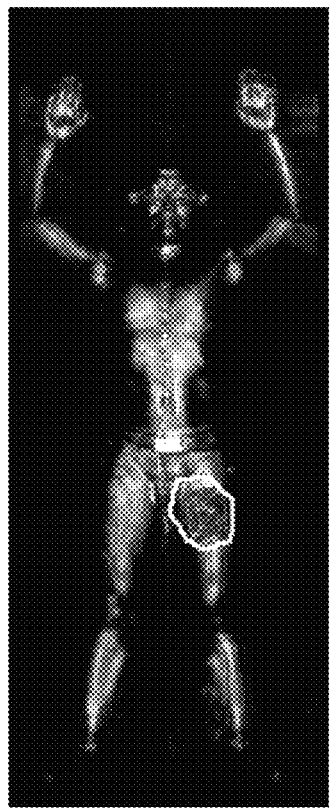
FIG. 3 is a schematic diagram of a second dangerous-object area identified in a microwave image according to an embodiment of the present disclosure.

In order to present the results of the automatic detection to the system operator to assist the system operator in making determinations, in one embodiment, after block S180 may further include:

extracting an edge profile of the second dangerous-object area; and displaying the extracted edge profile in the reference frame. For example, if the second frame is the reference frame, the extracted edge profile is identified in the microwave image of the second frame. Referring to FIG. 3, a schematic diagram of a second dangerous-object area identified in a microwave image according to an embodiment of the present disclosure is depicted. As shown in FIG. 3, the portion identified by the white curve in the microwave image is the edge profile of the second dangerous-object area.

Based on the same inventive concept, the present disclosure also provides a device for detecting concealed dangerous objects in microwave images. The specific implementation of the device according to the present disclosure will be described in detail below with reference to the accompanying drawings.

Figure 4:
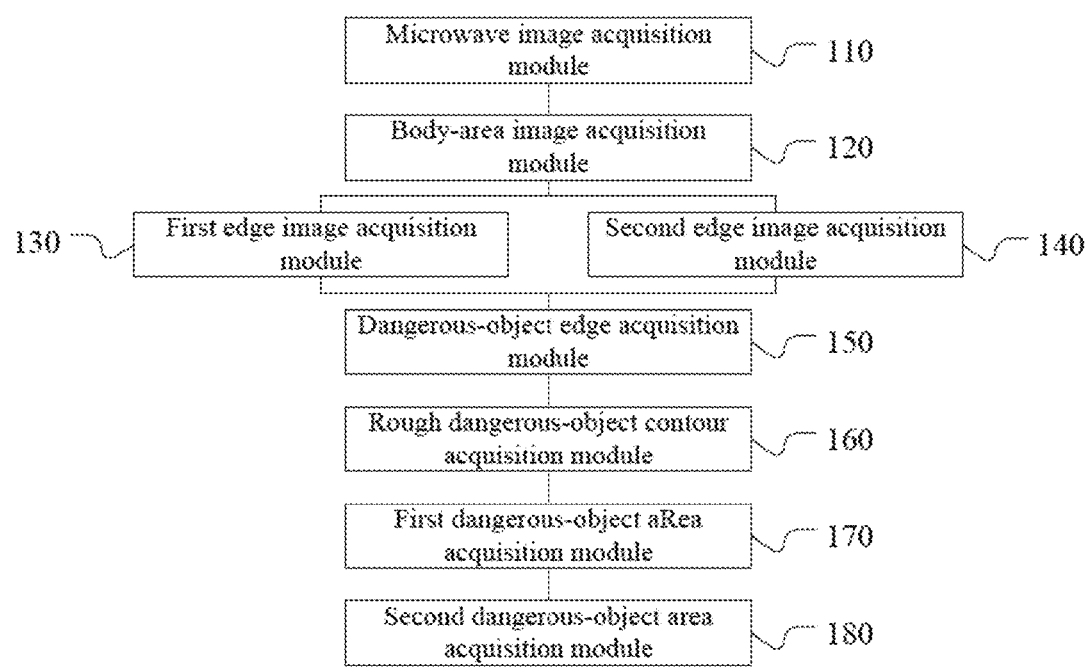
FIG. 4 is a schematic diagram of a device for detecting concealed dangerous objects in microwave images according to a first embodiment of the present disclosure.

Referring to FIG. 4, a schematic diagram of a device for detecting concealed dangerous objects in microwave images according to a first embodiment of the present disclosure is depicted. As shown in FIG. 4, the device for detecting concealed dangerous objects in microwave images includes:

a microwave image acquisition module 110 configured to obtain at least two adjacent microwave images of body detection results;

a body-area image acquisition module 120 configured to obtain a body-area image from each of the microwave images;

a first edge image acquisition module 130 configured to obtain dangerous-object areas from each body-area image, and perform an edge extraction on each of the dangerous-object areas to obtain a first edge image of each of the microwave images;

a second edge image acquisition module 140 configured to perform a dangerous-object edge detection n each body-area image to obtain second edge image of each of the microwave images;

a dangerous-object edge acquisition module 150 configured to perform a first edge fitting operation on the first edge image and the second edge image to obtain dangerous-object edges of each of the microwave images;

a rough dangerous-object contour acquisition module 160 configured to perform a registration operation and a second edge fitting operation on the dangerous-object edges of each of the microwave images to obtain a rough dangerous-object contour;

a first dangerous-object area acquisition module 170 configured to perform a regional-binarization operation on the rough dangerous-object contour to obtain a first dangerous-object area; and a second dangerous-object area acquisition module 180 configured to filter the first dangerous-object area to obtain a second dangerous-object area.

The microwave image acquisition module 110 obtains the microwave images $I_k$ which are sampled at different adjacent angles, and the number of obtained images may be determined according to actual needs. The body-area image acquisition module 120 segments the microwave images $I_k$ into a body region and a background region through a grayscale segmentation algorithm to obtain a body-area image $I_k'$, where the grayscale segmentation algorithm may adopt an automatic threshold segmentation algorithm in the prior art.

After the body-area image $I_k'$ is obtained, the edge image may be obtained in two different ways simultaneously: for the body-area image $I_k'$, the first edge image acquisition module 130 may use an adaptive fuzzy clustering algorithm to detect the dangerous-object areas, and then perform the edge extraction on the dangerous-object areas using an edge extraction operator such as canny operator to obtain the first edge image $e_{R_k}$; for the body-area image $I_k'$, the second edge image acquisition module 140 performs the edge detection directly on the dangerous-object areas by using an edge detection operator to obtain the second edge image $e_k$, where the edge detection operator adopts an operator existing in the prior art, such as canny operator.

In order to filter out part of the mis-detection area, the dangerous-object edge acquisition module 150 performs the edge fitting operation on the obtained first edge image $e_{R_k}$ and the second edge image $e_k$. In one embodiment, the dangerous-object edge acquisition module 150 may include:

a first absolute difference acquisition unit 1501 configured to obtain absolute values of differences between the first edge image and the second edge image; and a dangerous-object edge acquisition unit 1502 configured to retain edges in each of the microwave images with an absolute value of differences smaller than or equal to a preset first edge fitting threshold, and abandoning edges in each of the microwave images with an absolute value of differences greater than the first edge fitting threshold, to obtain the dangerous-object edges of each of the microwave images.

The rough dangerous-object contour acquisition module 160 performs the registration operation and the second edge fitting operation on, the obtained dangerous-object edges of each of the microwave images to obtain the rough dangerous-object contour. In one embodiment, the rough dangerous-object contour acquisition module 160 may include:

a feature set constructing 1601 configured to perform a feature-point detection and description operation on each of the microwave images, to build a feature set for each of the microwave images;

a corresponding relation acquisition unit 1602 configured to select one of the microwave images as a reference frame, and obtain the corresponding relations between feature points in the feature set of each of the microwave images except the reference frame, and the feature points in the feature set of the reference frame by Euclidean distance measure;

a mapping unit 1603 configured to map the dangerous-object edges of the microwave images except the reference frame to the reference frame according to each of the corresponding relations;

a second absolute difference acquisition unit 1604 configured to obtain absolute values of differences between the dangerous-object edges of the microwave images except the reference frame and the dangerous-object edges of the reference frame; and a rough dangerous-object contour acquisition unit 1605 configured to retain edges with an absolute value of differences smaller than or equal to a preset second edge fitting threshold, and abandoning edges with an absolute value of differences greater than the second edge fitting threshold, to obtain the rough dangerous-object contour.

The first dangerous-object area acquisition module 170 perform the regional-binarization operation on the obtained rough dangerous-object contour to obtain the first dangerous-object area. In one embodiment, the first dangerous-object area acquisition module 170 may include:

a first grayscale value setting unit 1701 configured to set a grayscale value of each pixel in the rough dangerous-object contour to 255; and a second, grayscale value setting unit 1702 configured to set a grayscale value of each pixel out of the rough dangerous-object contour to 0.

Since the obtained first dangerous-object area may contain some error information, the second dangerous-object area acquisition module 180 needs to perform filtering to obtain a precise dangerous-object area, that is, the second dangerous area. The filtering can be implemented according to existing methods in the prior art.

Figure 5:
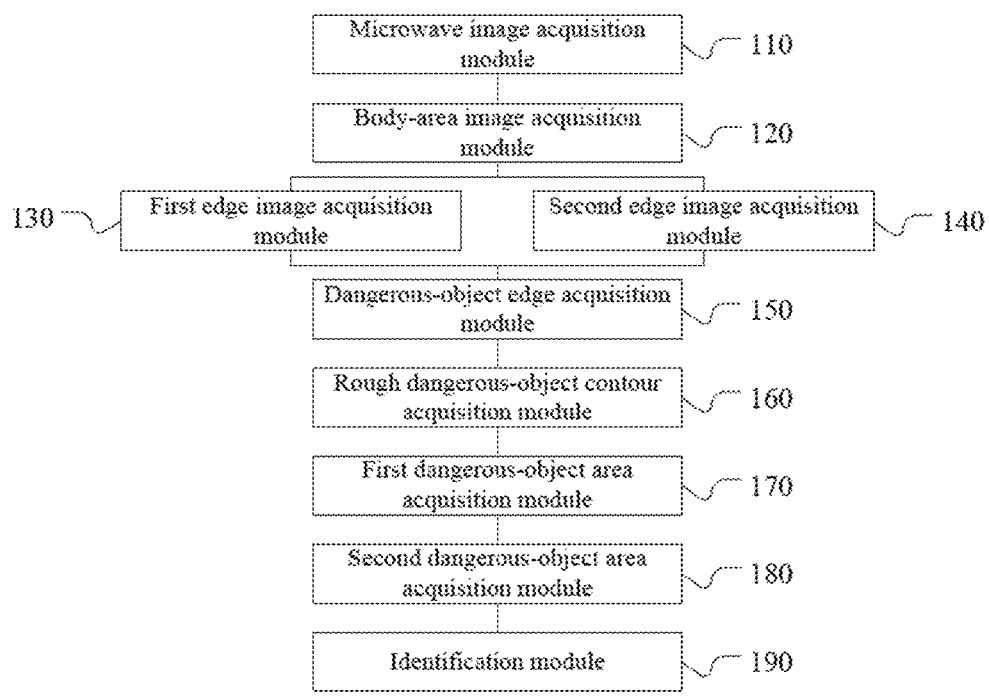
FIG. 5 is a schematic diagram of a device for detecting concealed dangerous objects in microwave images according to a second embodiment of the present disclosure.

In order to present the results of the automatic detection to the system operator to assist the system operator in making determinations, in one embodiment, as shown in FIG. 5, the device of the present disclosure may further include an identification module 190 connected to the second dangerous-object area acquisition module 180, in which the identification module 190 may include:

an edge profile extracting unit 1901 configured to extract an edge profile of the second dangerous-object area; and an edge outline displaying unit 1902 configured to display the extracted edge profile in the reference frame.

When comparing the present disclosure with the existing technology, it has the following advantages:

(1) The present disclosure comprehensively utilizes, the characteristics of the microwave detection results at different angles, which reduces the dependence of the detection result on a single image and the effect of imaging angle on the imaging quality of the dangerous-object areas.

(2) The present disclosure obtains the edge image in two ways simultaneously of each body-area image: detecting the dangerous-object areas and extracting the edges, as well as performing a dangerous-object area edge detection directly on the body-area image. Then, the edge fitting operation is performed on the edge image get through the two ways, so as to filter out part of the mis-detection area of each single image. Compared with the existing technology which simply relies on the grayscale value for detection, the present disclosure effectively improves the detection accuracy, while the real-time execution can be guaranteed.

(3) The present disclosure can be effectively applied to a real microwave security inspection system, which has high detection accuracy and calculation efficiency, and meets the requirements for use, and solves the problem of the automatic detection of the hidden dangerous objects under clothes in the microwave security inspection system.

The technical features of the above-mentioned embodiments may be combined arbitrarily. For the sake of the brevity of the description, possible combinations of the technical features in the above embodiments are not all described. However, as long as there is no contradiction in the combination of these technical features, all should be considered as within the scope of this specification.

The above-mentioned embodiments merely represent several examples of the present disclosure, and the description thereof is more specific and detailed, but it should not be considered as limitations to the scope of the present disclosure. It should be noted that, for those skilled in the art, various variations and improvements may be made without departing from the concept of the present disclosure and are all within the protection scope of the present disclosure. Therefore, the protection scope of the present disclosure shall be subject to the appended claims.

What is claimed is:

1. A method for detecting concealed dangerous objects in microwave images, comprising:
    obtaining at least two adjacent microwave images of body detection results;
    obtaining a body-area image from each of the microwave images;
    obtaining dangerous-object areas from each body-area image, and performing an edge extraction on each of the dangerous-object areas to obtain a first edge image of each of the microwave images;
    performing a dangerous-object edge detection on each body-area image to obtain a second edge image of each of the microwave images;
    performing a first edge fitting operation on the first edge image and the second edge image to obtain dangerous-object edges of each of the microwave images;
    performing a registration operation and a second edge fitting operation on the dangerous-object edges of each of the microwave images to obtain a rough dangerous-object contour;
    performing a regional-binarization operation on the rough dangerous-object contour to obtain a first dangerous-object area; and
    filtering the first dangerous-object area to obtain a second dangerous-object area.

2. The method of claim 1, wherein the performing the first edge fitting operation on the first edge image and the second edge image to obtain dangerous-object edges of each of the microwave images comprises:
    obtaining absolute values of differences between the first edge image and the second edge image; and
    retaining edges in each of the microwave images with an absolute value of differences smaller than or equal to a preset first edge fitting threshold, and abandoning edges in each of the microwave images with an absolute value of differences greater than the first edge fitting threshold, to obtain the dangerous-object edges of each of the microwave images.

3. The method of claim 1, wherein the performing the registration operation and the second edge fitting operation on the dangerous-object edges of each of the microwave images to obtain a rough dangerous-object contour comprises:
    performing a feature-point detection and description operation on each of the microwave images, to build a feature set for each of the microwave images;
    selecting one of the microwave images as a reference frame, and obtaining corresponding relations between the feature points in the feature set of each of the microwave images except the reference frame, and the feature points in the feature set of the reference frame by Euclidean distance measure;
    mapping the dangerous-object edges of the microwave images except the reference frame to the reference frame according to each of the corresponding relations;
    obtaining absolute values of differences between the dangerous-object edges of the microwave images except the reference frame and the dangerous-object edges of the reference frame; and
    retaining edges with an absolute value of differences smaller than or equal to a preset second edge fitting threshold, and abandoning edges with an absolute value of differences greater than the second edge fitting threshold, to obtain the rough dangerous-object contour.

4. The method of claim 1, wherein the performing the regional-binarization operation on the rough dangerous-object contour comprises:
    setting a grayscale value of each pixel in the rough dangerous-object contour to 255; and
    setting a gay scale value of each pixel out of the rough dangerous-object contour to 0.

5. The method of claim 1, wherein the filtering the first dangerous-object area to obtain the second dangerous-object area comprises:
    performing a morphological closed operation on the obtained first dangerous-object area along a x direction and a y direction; and
    filtering out sub-areas in the first dangerous-object area each having a size smaller than $T_a$, and remaining sub-areas as the second dangerous-object area, where $T_a$ is a natural number.

6. The method of claim 1, wherein after the filtering the first dangerous-object area to obtain the second dangerous-object area, the method further comprises:
    extracting an edge profile of the second dangerous-object area; and
    displaying the extracted edge profile in the reference frame.

7. A device for detecting concealed dangerous objects in microwave images, comprising:
    a microwave image acquisition module configured to obtain at least two adjacent microwave images of body detection results;
    a body-area image acquisition module configured to obtain a body-area image boor each of the microwave images;
    a first edge image acquisition module configured to obtain dangerous-object areas from each body-area image, and perform an edge extraction on each of the dangerous-object areas to obtain a first edge image of each of the microwave images;
    a second edge image acquisition module configured to perform a dangerous-object edge detection on each body-area image to obtain a second edge image of each of the microwave images;
    a dangerous-object edge acquisition module configured to perform a first edge fitting operation on the first edge image and the second edge image to obtain dangerous-object edges of each of the microwave images;
    a rough dangerous-object contour acquisition module configured to perform a registration operation and a second edge fitting operation on the dangerous-object edges of each of the microwave images to obtain a rough dangerous-object contour;
    a first dangerous-object area acquisition module configured to perform a regional-binarization operation on the rough dangerous-object contour to obtain a first dangerous-object area; and a second dangerous-object area acquisition module configured to filter the first dangerous-object area to obtain a second dangerous-object area.

8. The device of claim 7, wherein the dangerous-object edge acquisition module comprises:
a first absolute difference acquisition unit configured to obtain absolute values of differences between the first edge image and the second edge image; and
a dangerous-object edge acquisition unit configured to retain edges in each of the microwave images with an absolute value of differences smaller than or equal to a preset first edge fitting threshold, and abandoning edges in each of the microwave images with an absolute value of differences greater than the first edge fitting threshold, to obtain the dangerous-object edges of each of the microwave images.

9. The device of claim 7, wherein the rough dangerous-object contour acquisition module comprises:
a feature set constructing unit configured to perform a feature-point detection and description operation on each of the microwave images, to build a feature set for each of the microwave images;
a corresponding relation acquisition unit configured to select one of the microwave images as a reference frame, and obtain the corresponding relations between the feature points in the feature set of each of the microwave images except the reference frame, and the feature points in the feature set of the reference frame by Euclidean distance measure;
a mapping unit configured to map the dangerous-object edges of the microwave images except the reference frame to the reference frame according to each of the corresponding relations;
a second absolute difference acquisition unit configured to obtain absolute values of differences between the dangerous-object edges of the microwave images except the reference frame and the dangerous-object edges of the reference frame; and
a rough dangerous-object contour acquisition unit configured to retain edges with an absolute value of differences smaller than or equal to a preset second edge fitting threshold, and abandoning edges with an absolute value of differences greater than the second edge fitting threshold, to obtain the rough dangerous-object contour.

10. The device of claim 7, wherein the first dangerous-object area acquisition module comprises:
a first grayscale value setting unit configured to set a grayscale value of each pixel in the rough dangerous-object contour to 255; and
a second grayscale value setting unit configured to set a grayscale value of each pixel out of the rough dangerous-object contour to 0.

11. The device of claim 7, further comprising an identification module connected to the second dangerous-object area acquisition module, wherein the identification module comprises:
an edge profile extracting unit configured to extract an edge profile of the second dangerous-object area; and
an edge outline displaying unit configured to display the extracted edge profile in the reference frame.

* * * * *